United States Patent [19]

Siskind

[11] 4,376,045
[45] Mar. 8, 1983

[54] LIQUID TREATMENT APPARATUS

[75] Inventor: David A. Siskind, Brooklyn, N.Y.
[73] Assignee: Ecodyne Corporation, Chicago, Ill.
[21] Appl. No.: 262,108
[22] Filed: May 11, 1981
[51] Int. Cl.³ .............................................. B01D 21/24
[52] U.S. Cl. ..................................... 210/134; 210/101; 210/137; 210/197; 210/208; 210/519; 417/180; 417/189
[58] Field of Search ............... 210/197, 208, 519, 520, 210/528, 525, 137, 113, 117, 101, 133, 98, 134; 417/179, 180, 189

[56] References Cited

U.S. PATENT DOCUMENTS

| | | | |
|---|---|---|---|
| 2,381,589 | 8/1945 | Hayes | 417/189 |
| 2,987,007 | 6/1961 | Conkling | 417/189 |
| 3,397,788 | 8/1968 | Duff et al. | 210/197 |
| 3,441,045 | 4/1969 | Malone | 417/189 |
| 3,951,806 | 4/1976 | Young | 210/208 |
| 4,272,369 | 6/1981 | Love | 210/137 |
| 4,303,517 | 12/1981 | Love et al. | 210/208 |

Primary Examiner—Benoit Castel
Attorney, Agent, or Firm—Dressler, Goldsmith, Shore, Sutker & Milnamow, Ltd.

[57] ABSTRACT

In liquid sedimentation and clarification apparatus recirculation of previously settled solids is automatically controlled. Nozzles in an updraft tube produce a suction or pumping force for recirculating such solids, and a flow passage in alternate nozzles is kept closed at low inlet flow rates for untreated liquid. At higher flow rates the closed flow passages are gradually opened by the increased force of the incoming liquid acting against spring biased or weighted valve closure members.

10 Claims, 4 Drawing Figures

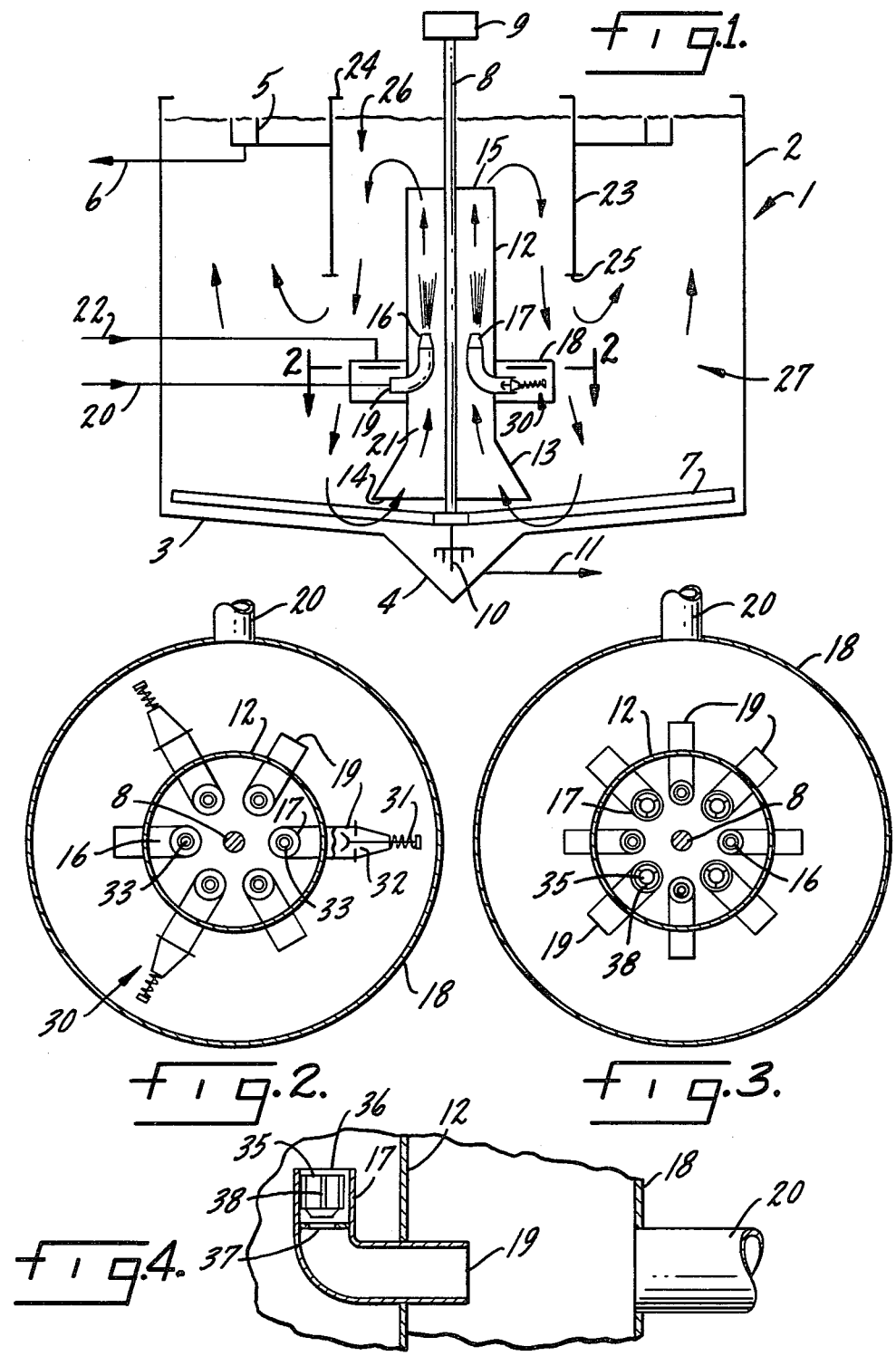

LIQUID TREATMENT APPARATUS

BACKGROUND OF THE INVENTION

This invention relates to liquid treating apparatus and more particularly to apparatus that employs sedimentation to remove dissolved and undissolved solids from water.

In sedimentation apparatus employing several liquid treatment zones, optimum treatment results can be attained when flow of solids between such zones is controlled over a wide range of operating conditions. Such equipment may have a solids settling zone, a solids mixing and recirculation zone and a solids uptake zone. The bottom of the uptake zone communicates with the settling zone and the upper end of the uptake zone communicates with the mixing and recirculation zone. The lower portion of the mixing and recirculation zone communicates with the settling zone. Solids from the settling zone and treatment chemicals are mixed with incoming untreated liquid in the uptake zone. This is accomplished by flowing the incoming liquid and treatment chemicals into the uptake zone through nozzles which cause a turbulent updraft in a tube that draws settled solids upwardly into the uptake zone.

The quantity of solids recirculating in such apparatus should be maintained in an optimum range to insure ample solids to achieve coagulation and clarification, while preventing solids from being discharged with the treated liquid. When the volume of liquid flowing through the apparatus changes, the quantity of solids being recirculated will also change. Prior arrangements used to adjust the recirculation of solids to compensate for changes in liquid flow were not automatic and hence depended on an operator to detect the flow change and to make the proper equipment adjustments. Also, prior manual flow adjustment arrangements were not always effective at the lowest flow rates.

OBJECTIVES OF THE INVENTION

Accordingly, it is an object of this invention to provide improved liquid treatment apparatus that can attain optimum operating conditions over a wide range of liquid flow volumes.

Another object is to automatically control the volume of solids recirculating in liquid sedimentation apparatus.

Another object is to eliminate the need for plant operating personnel to detect flow changes and to manually adjust the equipment to compensate for such changes.

Another object is to provide means for controlling recirculation of solids in sedimentation apparatus that maintains maximum pumping energy input.

Another object is to provide adequate mixing of recirculated solids in the uptake zone of a liquid clarifier at low flow rates.

Another object is to prevent excessive solids recirculation or turbulence from developing at the highest flow rates.

Another object is to provide simple, durable, automatic means for controlling the solids recirculation rate in water sedimentation apparatus that is relatively low cost, easily maintained and which does not possess defects found in similar prior art apparatus.

Other objects and advantages of the invention will be revealed by the specification and claims, and the scope of the invention will be set forth in the claims.

DESCRIPTION OF THE DRAWING

FIG. 1 is a cross sectional side view of a schematic representation of liquid treatment apparatus embodying the invention.

FIG. 2 is an enlarged cross sectional view taken along the line 2—2 in FIG. 1.

FIG. 3 is an enlarged cross sectional view corresponding to FIG. 2 but showing another embodiment of the invention.

FIG. 4 is a cross sectional side view of the embodiment of FIG. 3.

DESCRIPTION OF A PREFERRED EMBODIMENT

The drawing shows apparatus 1 that treats and clarifies liquids by sedimentation. This kind of equipment is used for softening water by the cold lime-soda ash process, and for the clarification of waters containing suspended solids, color, and organic impurities by coagulation with alum or ferric sulfate or other coagulants. Coagulation and softening can be carried out simultaneously. The coagulants or precipitates formed within the apparatus have an enormous surface area upon which the dissolved or colloidally dispersed impurities are absorbed. The suspended impurities are surrounded by the gelatinous precipitates and themselves become part of the precipitate, which settles to the bottom of the apparatus.

When water is softened by this process, calcium hydroxide is added to the water to precipitate the calcium bicarbonate as calcium carbonate and the magnesium salts as magnesium hydroxide. Sodium carbonate is added to the water to react with the calcium chloride and calcium sulfate originally present in the water as well as that formed by the reaction of calcium hydroxide with magnesium chloride and sulfate. The reaction of sodium carbonate with these salts forms calcium carbonate. Thus, the calcium and magnesium salts originally present in the water are removed as the slightly soluble compounds, calcium carbonate and magnesium hydroxide, precipitate out. A coagulant such as alum, sodium aluminate, or ferric sulfate can be employed in the treatment to assist in the separation of the turbidity, precipitates, and other solids formed from the water.

Apparatus 1 includes a cylindrical open-topped tank 2 having a bottom 3 which slopes downwardly to a conical sump 4 where settled solids are collected. An overflow weir 5 at the upper end of tank 2 collects treated water for discharge through an outlet line 6 and determines the upper surface level of the water in tank 2. A rotatable rake 7 adjacent bottom 3 pushes settled solids toward sump 4. Rake 7 is connected to vertical shaft 8 which is rotated by a motor and gear box assembly 9 in conventional manner. Shaft 8 extends through the center of tank 2. Sludge thickeners 10 in sump 4 are also turned by shaft 8 and settled solids are removed from the sump for disposal through discharge line 11.

A cylindrical, open-ended, vertical updraft tube 12 is coaxial with shaft 8. Tube 12 may have a predetermined constant diameter for most of its length and an enlarged lower end portion 13. The bottom edge 14 of enlarged portion 13 terminates above but adjacent to rake 7. The upper edge 15 of tube 12 terminates below the upper level of the water in tank 2. A plurality of upwardly directed nozzles 16 and 17 are uniformly spaced around the inside of tube 12 intermediate its ends. A manifold 18 for incoming untreated water surrounds tube 12 and an inlet 19 of each nozzle 16 and 17 communicates with the inside of the manifold. An inlet line 20 connects manifold 18 to a pressurized source of untreated water. The pressurized water exiting from nozzles 16 and 17 flows rapidly up and out of upper end 15 of tube 12; this draws settled solids from the bottom of tank 2 into lower end 14 and forces such settled solids up through tube 12 and out its upper end 15 with the incoming untreated water. Thus, the inside surface of tube 12 defines a solids uptake zone 21 for transporting previously settled solids into the upper part of tank 2. Water treating chemicals may be mixed with the incoming untreated water and fed in through line 20, or they may be added separately through one or more chemical inlet lines, such as 22.

A cylindrical baffle 23 surrounds and is coaxial with tube 12. The upper end 24 of baffle 23 extends above the upper level of the water in tank 2, and the lower end 25 of baffle 23 terminates above the lower edge 14 of tube 12. The inside surface of baffle 23 defines a generally annular solids mixing and recirculation zone 26 above and around tube 12 within the confines of the baffle. The turbulent liquid flow in zone 26 mixes the treatment chemicals and the incoming untreated water with the previously settled solids from the bottom of tank 2. The previously settled solids will adhere to newly formed precipitates and to solids that enter with the untreated water and thereby increase the overall solids settling rate of apparatus 1 when the previously settled solids are present in the proper ratio. The outer surface of baffle 23 and the inside surface of tank 2 define a solids settling or sedimentation zone 27 that surrounds baffle 23 and tube 12.

Apparatus 1 includes pressure sensitive means 30 for automatically regulating the quantity of previously settled solids drawn upwardly into tube 12. In the embodiment of FIGS. 1 and 2, automatic regulation is achieved by placing a spring actuated poppet valve 31 in the water inlet passage 32 of each valve 17 inside of manifold 18. The strength of the springs in valves 31 is selected so that the valves will be closed at the lowest inlet flow volume in the predetermined flow range for apparatus 1, and so that the suction at the bottom of tube 12 is generally constant from about one-quarter to maximum flow rate. Nozzles 16 are always open. There should be an even number greater than five of nozzles 16 and 17, and valves 31 are placed in every other nozzle. The outlet ends 33 of nozzles 16 and 17 may have the same size. The size of the ends 33 of nozzles 16 is predetermined so that flow through tube 12 produces adequate solids recirculation at the lowest inlet flow volume in the predetermined flow range for apparatus 1. As flow volume increases, valves 31 begin to open in proportion to the volume of liquid flowing into manifold 18. This causes the size of the liquid inlet passage 32 in nozzles 17 to vary in proportion to the volume of liquid flow, while at the same time dissipating some of the pressure of the incoming liquid against the springs in valves 31. This automatically regulates the flow through and pressure in tube 12 to ensure that enough solids will be drawn up into tube 12 at the lowest flow volumes, while preventing excessive flow velocities of liquid exiting from tube 12 at the highest flow volumes from causing turbulence that interferes with sedimentation in zone 27.

FIGS. 3 and 4 show another embodiment of the invention that is identical to that of FIGS. 1 and 2, except as shown and described hereafter. Automatic regulation is achieved by placing a weighted valve closure member 35 in the upwardly directed outlet end 36 of each nozzle 17 inside of tube 12. Members 35 seat in valve passages 37 and are held in alignment with their seats by wings 38. As in the previous embodiment, there are an even number greater than five of uniformly spaced nozzles 16 and 17, and the nozzles 17 containing the automatic flow control means alternate with nozzles 16. Nozzles 16 are always open, but the weight of members 35 is selected so that they will be seated to close passages 37 at the lowest inlet flow volume for the predetermined flow range for apparatus 1. The size of outlet ends 33 of nozzles 16 and 17 need not be identical, but the size of the ends 33 of nozzles 16 is predetermined so that flow through tube 12 produces adequate solids recirculation at the lowest inlet flow volume in the predetermined flow range of Apparatus 1. As flow volume increases members 35 begin to lift off the seats in passages 37 in proportion to the volume of liquid flowing into manifold 18. This causes the size of the water inlet or valve passages 37 to vary in proportion to water flow volume, and at the same time dissipates some of the pressure of the incoming water against the pull of gravity on weighted member 35 to maintain a generally constant suction at the bottom or inlet end 14 of tube 12. This automatic regulation has the same benefits described above with reference to FIGS. 1 and 2.

Apparatus 1 may include conventional clarifier components and structural members, such as supports for the baffle, tube and weir, handrails, walkways and the like. However, such items have not been shown or described because their details do not form a part of the present invention.

It has thus been shown that by the practice of this invention a liquid clarifier or sedimentation apparatus may be operated over a widely varying range of inlet flow rates. This is accomplished because incoming liquid flows through only half of the recirculation nozzles 16 and 17 at the lowest flow rates. These nozzles 16 are sized to produce enough pumping action in tube 12 to recirculate sufficient settled solids to ensure proper liquid treatment at the lowest flow volumes. As incoming flow increases, pressure sensitive means in the form of valves 31 or weighted closure members 35 respond to the increased pressure in nozzles 17 to open liquid flow passages. This accommodates increased liquid flow volume and permits a proportional increase in the quantity of solids recirculated, but prevents excessive flow velocities exiting from tube 12 to interfere with sedimentation. Plant operating personnel need not detect or respond to changes in inlet flow volume.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Liquid treating apparatus comprising:
    A. a tank having a treated liquid outlet at its upper end and a settled solids outlet at its bottom, a rotatable rake adjacent the bottom of said tank for moving settled solids toward said settled solids outlet, and power-driven means for rotating said rake;

B. an open-ended vertical updraft tube centered in said tank, the lower end of said tube terminating above said rake, the upper end of said tube terminating below the upper surface of the liquid in said tank, baffle means surrounding and coaxial with said tube, the upper end of said baffle means extending above the upper surface of the liquid in said tank, and the lower end of said baffle means terminating above said lower end of said tube, said baffle means defining a solids mixing and recirculation zone in said tank surrounding said tube;

C. a manifold for untreated liquid around said tube, means connecting said manifold to a pressurized source of untreated liquid;

D. a plurality of untreated liquid inlet nozzles defining liquid passages therethrough, each having an upwardly directed outlet end within said tube, an inlet end of said nozzle communicating with the inside of said manifold, the pressurized liquid exiting from said nozzles flowing rapidly up and out of said upper end of said tube, thereby drawing settled solids into said lower end of said tube and through said tube where such solids mix with such untreated liquid;

E. means for automatically regulating the quantity of settled solids drawn upwardly into said tube as the flow of incoming untreated liquid varies comprising pressure sensitive means for automatically varying the size of the liquid passages in at least some of said nozzles in proportion to the volume of liquid flowing into said manifold;

F. means defining a solids settling zone in said tank.

2. The invention defined in claim 1, wherein said nozzles are uniformly spaced apart in said tube.

3. The invention defined in claim 2, wherein the number of nozzles is an even number greater than five, and every other nozzle includes said automatic regulating means.

4. The invention defined in claim 1, wherein said pressure sensitive means controls the size of said inlet end of some of said nozzles.

5. The invention defined in claim 4, wherein said pressure sensitive means is a spring actuated poppet valve.

6. The invention defined in claim 1, wherein said pressure sensitive means controls the size of said outlet end of some of said nozzles.

7. The invention defined in claim 6, wherein said pressure sensitive means is a weighted valve closure member that is pulled by gravity against the liquid flow so as to close a passage in said outlet end.

8. The invention defined in claim 1, wherein said liquid treating apparatus is sized to treat a varying volume of liquid in a predetermined flow range, and said automatic regulating means completely stops flow through some of said nozzles when such volume of flow is at the lowest value of said flow range.

9. The invention defined in claim 8, wherein said automatic regulating means stops flow through at least half of said nozzles.

10. Water treating apparatus comprising:

A. a cylindrical open-topped tank having a treated water overflow outlet weir adjacent its upper end and a sump for collecting settled solids at its bottom, a rotatable rake adjacent said bottom for moving settled solids toward said sump, power driven vertical shaft means coaxial with the center of said tank connected to said rake for rotating said rake, and means for removing settled solids from said sump;

B. a generally cylindrical, open-ended vertical updraft tube of predetermined diameter surrounding and coaxial with said shaft means, the lower end of said tube terminating above but adjacent said rake, the upper end of said tube terminating below the upper surface of the water in said tank, an even number of upwardly directed untreated water inlet nozzles defining liquid passages therethrough uniformly spaced in said tube, a manifold for untreated water surrounding said tube, an inlet end of each of said nozzles being connected to the inside of said manifold, and means connecting said manifold to a pressurized source of untreated water, the pressurized water exiting from said nozzles flowing rapidly up and out of said upper end of said tube and drawing settled solids into said lower end of said tube and through said tube where such solids mix with incoming untreated water;

C. a cylindrical baffle surrounding and coaxial with said tube, the upper end of said baffle extending above the upper surface of the water in said tank, and the lower end of said baffle terminating above said lower end of said tube, said baffle defining a mixing and recirculation zone in said tank surrounding said tube;

D. means for automatically regulating the quantity of settled solids drawn upwardly into said tube as the flow of incoming untreated water varies comprising pressure sensitive means for automatically varying the size of said liquid passages in half of said nozzles in proportion to the volume of liquid flowing into said manifold; and E. means defining a solids settling zone including the lower portion of said tank.

* * * * *